United States Patent [19]

Leonard

[11] Patent Number: 5,320,866
[45] Date of Patent: Jun. 14, 1994

[54] METHOD OF WET COATING A CERAMIC SUBSTRATE WITH A LIQUID SUSPENSION OF METALLIC PARTICLES AND BINDER APPLYING SIMILAR DRY METALLIC PARTICLES ONTO THE WET SURFACE, THEN DRYING AND HEAT TREATING THE ARTICLE

[75] Inventor: John F. Leonard, Beavercreek, Ohio

[73] Assignee: The United States of America as represented by the Secretary of the Air Force, Washington, D.C.

[21] Appl. No.: 514,909

[22] Filed: Apr. 26, 1990

Related U.S. Application Data

[62] Division of Ser. No. 261,803, Oct. 24, 1988.

[51] Int. Cl.⁵ .............................................. B05D 3/02
[52] U.S. Cl. .................................. 427/191; 427/205; 427/383.3; 427/380; 427/419.1; 427/421; 427/226
[58] Field of Search ............ 427/191, 205, 374.1, 427/376.3, 383.5, 421, 419.1, 380, 224; 29/890.032

[56] References Cited

U.S. PATENT DOCUMENTS

| | | | |
|---|---|---|---|
| 3,762,011 | 10/1973 | Staudhammer et al. | 29/890.032 |
| 3,840,069 | 10/1974 | Fischer et al. | 165/105 |
| 3,915,741 | 10/1975 | Kogiso et al. | 136/6 FS |
| 4,082,863 | 4/1978 | Dancy et al. | 427/181 |
| 4,207,209 | 6/1980 | Matsuda et al. | 502/304 |
| 4,207,391 | 6/1980 | Church et al. | 204/2.1 |
| 4,274,479 | 6/1981 | Eastman et al. | 165/104.26 |
| 4,307,164 | 12/1981 | Church et al. | 429/207 |
| 4,352,392 | 10/1982 | Eastman | 165/104.25 |
| 4,356,241 | 10/1982 | Wright et al. | 429/104 |
| 4,372,823 | 2/1983 | Church et al. | 204/2.1 |
| 4,381,216 | 4/1983 | Singh | 156/667 |
| 4,439,502 | 3/1984 | Bittihn et al. | 429/104 |
| 4,665,049 | 5/1987 | Miyai et al. | 502/400 |
| 4,690,914 | 9/1987 | Callut et al. | 502/400 |
| 4,885,129 | 12/1989 | Leonard et al. | 29/890.032 |
| 4,929,414 | 5/1990 | Leonard et al. | 29/890.032 |
| 4,964,457 | 10/1990 | Leonard et al. | 29/890.032 |

Primary Examiner—Shrive Beck
Assistant Examiner—Benjamin L. Utech
Attorney, Agent, or Firm—Gerald B. Hollins; Donald J. Singer

[57] ABSTRACT

A method for fabricating a liquid conducting porous article having micron sized metallic particles suspended on a ceramic substrate member. The method includes coating the ceramic substrate with a particle slurry on top of which is added an additional amount of the same particles as a dry powder, and then heat treating the article in a reducing gas atmosphere. The use of less than ten micron sized Nickel particles for the porous material and sintered fusion of the particles are also included.

6 Claims, 2 Drawing Sheets

METHOD OF WET COATING A CERAMIC SUBSTRATE WITH A LIQUID SUSPENSION OF METALLIC PARTICLES AND BINDER APPLYING SIMILAR DRY METALLIC PARTICLES ONTO THE WET SURFACE, THEN DRYING AND HEAT TREATING THE ARTICLE

RIGHTS OF THE GOVERNMENT

The invention described herein may be manufactured and used by or for the Government of the United States for all governmental purposes without he payment of any royalty.

This is a division, of application Ser. No. 07/261,803, filed Oct. 24, 1988.

CROSS REFERENCE TO RELATED APPLICATIONS

The following patent applications are somewhat related and have the same file date. Some of these applications also include one or more of the present application inventors as a named inventor thereof and are also commonly assigned to the Government of the United States represented by the Secretary of the Air Force. Each of these applications is also hereby incorporated by reference herein. Certain of these document matured form a single into plural applications.

| SIR/PATENT/ Serial Number | Title |
| --- | --- |
| H858 | Electrical Battery Cell Wicking Structure and Method |
| H971 | |
| 4,894,298 | Rigidized Porous Material and Method |
| 4,929,414 | Alkali and Halogen Rechargeable Cell with Reactant Recombination |
| 4,885,129 | A Method of Manufacturing Heat Pipe Wicks and Arteries |
| and 07/564,898, pending | A Method of Manufacturing Heat Pipe Wicks |
| 4964457 | Unidirectional Heat Pipe and Wick |

BACKGROUND OF THE INVENTION

This invention to porous media useful in the surface tension transfer of liquids and especially to the fabrication of porous media structures. The achieved porous medium is useful in a variety of technical arts including the herein referred to electrical battery cell and heat pipe arts.

The transportation of liquid materials to elevated or otherwise liquid reservoir separated locations without the use of moving parts is a useful concept that is often employed in, for example, the electrical battery cell, machinery lubrication, combustion and other chemical reaction and the heat transfer arts. In each of these uses, there is need for relatively small quantities of a liquid material to be present in physical locations that are distal from the reservoir liquid material an in conditions which are preferably free of pumps or other mechanically operated fluid displacement arrangements.

In certain of such uses, there is also present a need for effective transfer of thermal energy and of the accomplishment of such transfer in situations which may include any of the liquid, gaseous, and solid physical states of material. Porous media, especially the porous media of the present invention are useful in accomplishing energy transfer involving the flow and especially the recirculating flow of liquid effluents as in the heat pipe.

The patent art includes a number of examples of porous media structures and their fabrication and is indicative of the modern evolution of this art. Included in this art is the patent of K. P. Staudhammer et al, U.S. Pat. No. 3,762,011 which concerns the fabrication of a wick for use in a heat pipe. The Staudhammer patent contemplates wick preparation by the application of a slurry of high thermal conductivity particles and organic binder and organic solvent to the surface of a heat pipe. This application is followed by evaporation of the solvent and utilization of binder material surface tension properties to draw the high conductivity particles together in a bonded and compacted condition. The achievement of compacted material is followed by curing of the binder. In the Staudhammer wick structure, cured binder material is used to hold the wick together in an integral condition and to retain the wick structure in predetermined relationship with the attending heat pipe surfaces. This cured binder arrangement constrast with the particle retention arrangement of the present invention. The Staudhammer particle size, particles of mesh size between 50 and 200 microns, an the use of an organic binder and its participation as a particle densifying mechanism also distinguish the Staudhammer structure from the present invention.

The prior patent activity also includes the patent of W. Fischer et al, U.S. Pat. No. 3,840,069 which concerns a sintered heat pipe capillary structure having distribution of both fine pores and coarse pores. In the Fischer et al structure, the wick pores are formed in a sintered metal powder structure by either removing one metal components of the powder grains through a chemical reaction or by an alternate oxidizing and reduction chemical treatment of the metal powder structure or by the use of metal powder having grains of different size in the powder composition.

The patent of E. A. Dancy et al, U.S. Pat. NO. 4,082,863, concerns the fabrication of a ceramic heat pipe wherein tis disposed a capillary layer of metal oxide ceramic material used to conduct the heat transfer fluid. In the Dancy et al patent, a substrate member is coated with an aqueous slurry of metal oxide ceramic having a maximum particle six of about 44 microns and the slurry is covered with a granular ceramic material having a particle size int he rang of 250 to 500 microns. According to a further aspect of the Dancy et al patent slurry material is also drawn up between particles and this fabrication is followed by firing of the coated surface at a temperature effecting bonding of the ceramic layer.

The Dancy et al patent is particularly directed toward the fabrication of ceramic heat pipes made from dielectric materials. The dancy et al heat pipe contemplates use of a variety of fabrication materials including metal, glass and alumina ceramic materials with the working fluid including liquefied gases, liquid metal, hydrocarbons, fluorocarbons, ammonia, water, actone, methanol, ethanol, the Freon ® compounds, and other fabricated working fluids.

The Dancy et al heat pipe also contemplates use of sintered metal structures in order to achieve good heat transfer between the heat pipe capillary maze and the heat pipe container, see column 2, lines 35-39. Silica is said to be an essential constituent of the mixture used in fabricating the Dancy et al structure because of its large melting point range and its resulting action as a glue between substrate and porous capillary material, see column 3, line 57. In the Dancy et al structure, the fine particles of slurry mixture are sued in order to achieve gluing action between substrate and larger particles of the slurry mixture, see column 4, lines 33–40. The ceramic substrate, use of oxide powder materials, larger particle size and gluing action of the slurry material inter alia distinguish the Dancy et al apparatus from that of the present invention.

The patent of G. Y. Eastman, U.S. Pat. O. 4,474,479, also concerns a heat pipe capillary wick structure, a structure fabricated from sintered metal—and disposed with longitudinal grooves on its interior surface. The Eastman wick grooves provide longitudinal capillary pumping while the sintered wick provides a high capillary pressure to fill the grooves and assure effective circumferential distribution of the heat transfer liquid. The eastman patent also contemplates use of a viscous paste material for forming a wick structure, see column 4, lines 50–55. At columns 4, line 16, Eastman patent also describes the sue of a hydrogen atmosphere and temperatures in the 900° C. range for fabricating a copper powder based wick structure.

Other known patens of possible interest as background with respect to the present invention include U.S. Pat. No. 4,665,049.

None of these patent examples of their combination, however, suggest the porous material structure of superior liquid transporting capability and heat transfer capability of the present invention.

SUMMARY OF THE INVENTION

In the present invention, a rigidized porous material member, which employs particles of small and substantially equal size physical dimensions is achieved. The resulting structure is usable in a variety of technical arts involving surface tension liquid transportation.

It is an object of the invention, therefore, to provided an improved surface tension liquid transportation apparatus and a fabrication sequence therefor.

It si another object of the invention to provide a liquid wicking apparatus which employs metallic particles of small physical size in its fabrication.

It is another object of the invention to provide a liquid effluent wicking apparatus which can be fabricated conveniently and at low cost.

It is another object of the invention to provide a porous material that is useful in a combined liquid effluent transportation and heat transfer utilization.

It is another object of the invention to provide a porous material fabrication sequence in which the application of heat energy accomplishes both viscous binder dissipation/disintegration and capillary wick cavity formation.

It is another object of the invention to provide a fabrication sequence in which a heat energy application also accomplishes sintering fusion of particles into a unitary rigid structure.

It is another object of the invention to provide a wicking structure that is particularly adapted to the transportation of liquid metal effluent.

it is another object of the invention to provide a porous material structure that is useful in conducting fluid effluent within a heat pipe.

It is another object of the invention to provide a rigidized particle structure that is usable in the nucleate boiling mode of heat transfer.

It is another object of the invention to provide a metal particles wicking arrangement that accomplishes significantly improved wicking action in comparison with conventional wick arrangements.

Additional objects and features of the invention will be understood from the following description and the accompanying drawings.

These and other objects of the invention are achieved by coating a substrate member with a liquid suspension of finely divided metal particles in an organic binder, adding additional dry metallic particle powder to the surface of the liquid suspension coating, drying the metallic particle coating, and heat treating the metallic particle coating in a reducing gas atmosphere held above the decomposition temperature of the organic binder material and below the melting point of the metal particles.

DETAILED DESCRIPTION

Figure 1:
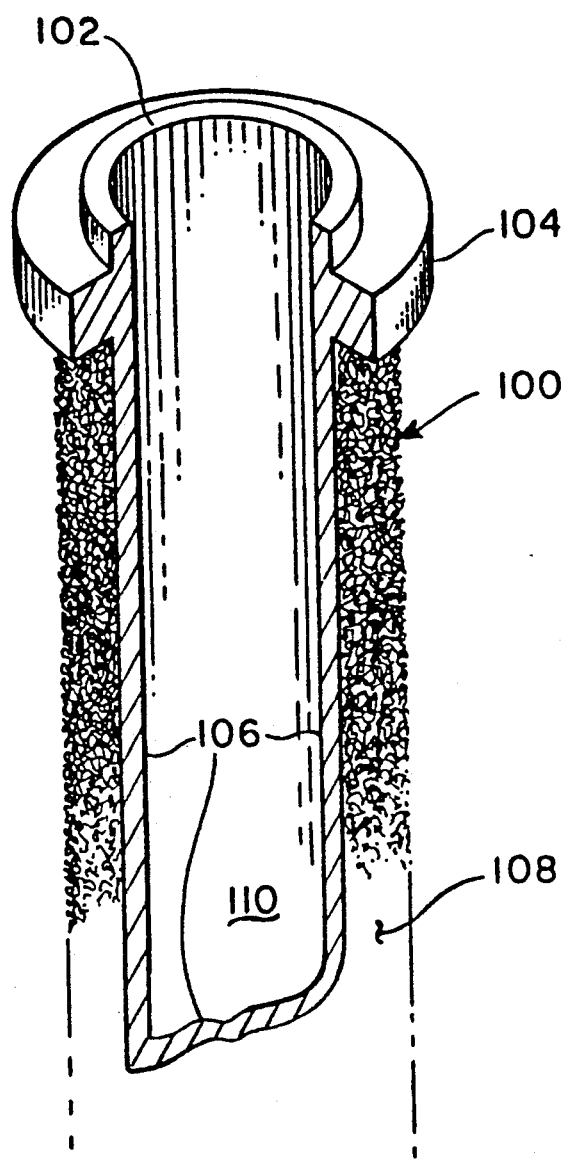
FIG. 1 shows a portion of an electrical battery cell that is provided with a porous material wicking member in accordance with the present invention.

FIG. 1 in the drawings shows a rigidized porous material capillary wick structure that is disposed on one element of an electrical battery cell. The FIG. 1 wick serves the purpose of improving the contact or wetting action of one battery reactant material with the substrate member 102 when the FIG. 1 structure is immersed in liquefied battery reactant materials. A detailed description of the battery art usage of the herein described porous material is contained in one of the above-identified co-pending patent applications, "Electrical Battery Cell Wicking Structure and Method". Since the electrical battery cell of varying types is but one of the possible uses of the present invention, and the other uses recited early in the background of the invention topic above are also merely examples of the uses that will occur to persons skilled in the art, the present disclosure will make repeated references to two of the possible of these uses—the electrical battery cell and a heat pipe liquid conveyance with the understanding that such references are exemplary and not limiting in nature.

The battery cell element of FIG. 1 includes the substrate member 102 which is in actuality a solid electrolyte member for use in, for example, a sodium and sulfur electrical battery cell. The substrate member 102 is provided with a flange 104 for capturing the substrate or electrolyte member with the battery cell. The substrate or electrolyte member is shown to be cut away as indicated at 106 in order that the interior portion thereof be visible.

On the exterior surface 108 of the substrate member 102 is disposed a wicking material coating 100 which is more fully described below and which serves to enhance the reactant material wetting or contact with the exterior surface 108 of the substrate member 102. The wicking material coating 100 is especially useful in electrical battery cell embodiments such as the sodium sulfur cell wherein the liquid sodium reactant material has minimal wetting affinity for materials, such as for the preferred beta double prime alumina, used for fabricating the substrate member 102. Because of this poor wetting affinity, it has become common practice in fabricating battery cells of this type to use physical structure elements and other complexities that are disposed adjacent the electrolyte or substrate 102 member in order to promote travel and intimate contact or wetting by the sodium reactant material.

In other arrangements of the wicking structure according to the invention, the wicking material 100 may be disposed on a different type and shape of substrate member or alternately may be fabricated as a stand-alone or separate structure that is not associated with a substrate member. Certain modification of the wicking member fabrication sequence herein described are required when the wicking material coating is disposed in this stand-alone configuration. The fabrication sequence and its modifications are described in connection with FIG. 2 below.

A wicking material coating may, of course, be disposed on the internal surface 100 of a substrate—electrolyte member 102 in FIG. 1 when such disposition is required by the employed battery cell reactant configuration; such internally disposed wicking structures are also appropriate for use in the heat pipe uses of the invention. For use in a battery cell environment as shown in FIG. 1, the wicking material coating 100 may be fabricated with a thickness in the range of 0.02 inch to 0.08 inch or 0.5 to 2.0 millimeters; with other thicknesses especially for other utilizations of the wicking material, being possible.

Figures 2, 3:
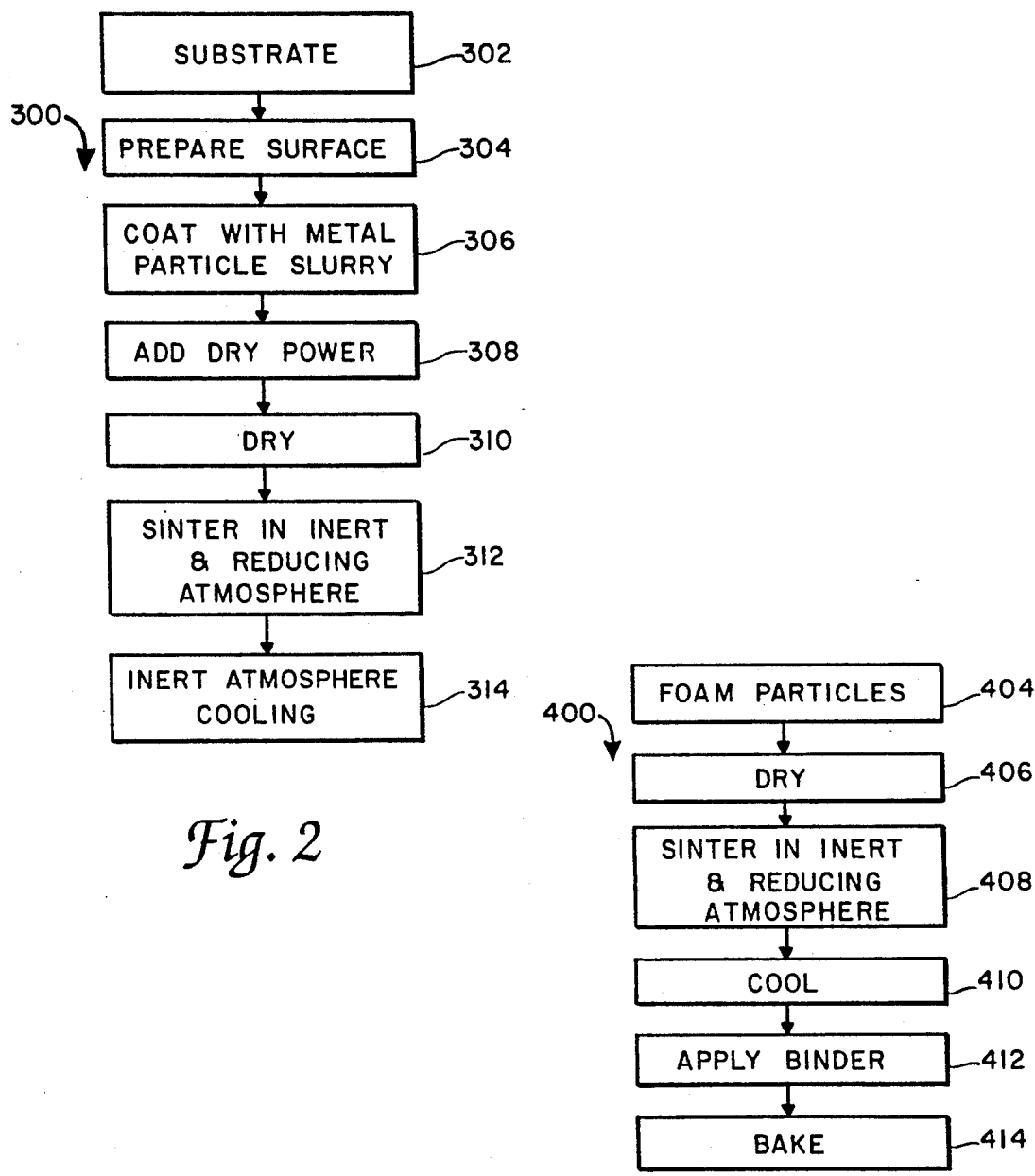
FIG. 2 shows a method for fabricating a porous material wicking member of the FIG. 1 and FIG. 2 type.
FIG. 3 shows an alternate fabrication step sequence for the invention.

In drawings of my United States Statutory Invention Registration (SIR) H971 dated Oct. 1, 1991 accordance with invention. This FIG. 2 drawing shows the nature of the present invention the FIG. 1 wicking material 100—as the porous metallic material appears following its subjection to a physical fracture event. This FIG. 2 drawing of the H971 SIR is therefore hereby incorporated by reference herein. In view of this incorporation and the cancellation of a similar microphotograph from the drawings of the present document's application, all reference to an "incorporated FIG. 2~ drawing herein are to be interpreted as a reference to the FIG. 2 drawing of the H071 SIR and all reference to a "FIG. 2" drawing are to be interpreted as references to the FIG. 2 in the present document. The incorporated FIG. 2 microphotograph is descriptive of one face of the fracture at a magnification of 1,000 times. A series of externally located arrow paris and individual arrows, each of which is numbered, indicate text described internal features of the incorporated FIG. 2 porous material; the features thusly identified in incorporated FIG. 2 are to the best degree possible, of sufficient prominence and size as to be of reproducible during electrostatic or other copying of the incorporated FIG. 2 microphotograph. This numbered arrow reference arrangement is selected in view of the glossy and non-markable nature of the microphotographic print submitted in application.

In incorporated FIG. 2, the fracture surface nature of the microphotograph and the magnification ratio of the image are indicated by the arrow 200 at the top of the figure. The two arrows, 202 and 204, in incorporated FIG. 2 together indicate the horizontal and vertical coordinates of one easily identified component particle of the incorporated FIG. 2 material. As indicated by this particle, the porous or wicking material of the present invention is preferably fabricated of particles having a single radius dimension, that is, fabricated form spherically shaped particles having a uniform particle size. When fabricated as a rigidized metallic powder structure, the particle identified by the arrows 202 and 204 is of some three to five microns diameter and may be, for example, composed of metallic nickel such as the nickel in powdered form that is available from International Nickel Corporation with specified ranges of average particle size under the identifying name of e.g. type 255 MOND metal powder. Alternate types of nickel powder include the type NI228 electronic grade powder of three microns nominal size, the type NI227 plasma spray power of 150 microns and larger size, an the type NI172 plasma spray powder of 200 mesh or about 75 microns particle size, all of which are available in 99.0% purities from Atlantic Equipment Engineers Inc. of Bergenfield, N.J. The larger particle size powders, of course, result in larger conduction paths in the incorporated FIG. 2 type of structure and may be desirable in some uses of the invention—particularly when effluents of greater viscosity are to be conveyed via the porous material.

Two particularly well-defined, close to the fracture surface, and highly illuminated ridge structures are indicated by the arrows 210 and 211 in incorporated FIG. 2. The slop of the arrows 210 and 211 also indicates the general course of the designated ridge in the incorporated FIG. 2 microphotograph. As is illustrated by the structure of the ridges 210 and 211, the incorporated FIG. 2 porous or wicking material is comprised of a very large number, a plethora, of individual particles which are randomly disposed and attached to each other to define a random maze or convoluted array of capillary passages— passages which are readily utilized as conduction paths by a liquid effluent material. The arrow pairs 206, 208 and 212, 214 indicate the vertical and horizontal locations of two such convoluted paths which extend into the depth of the incorporated FIG. 2 microphotograph.

As is described in FIG. 2 of the present document, formation of the FIG. 1 and incorporated FIG. 2 porous or wicking material structure is preferably accomplished with a suspension of particles in a viscous binder solution, followed by driving off or dissipation of the liquid and organic components of the binder material during an elevated temperature exposure. During dissipation of the liquid and organic components of the binder material, surface tension and other coagulation forces bring the wicking material particles into a packed an closely adjacent physical relationship. The further elevated temperatures of a sintering operation fuses the packed individual particles into the structure shown in FIGS. 1 and in incorporated 2.

The wicking performance of the FIG. 1 and incorporated FIG. 2 porous material has been found to be superior to the performance of more conventional wick arrangements. By way of example, a wick in accordance with the FIG. 1 and incorporated FIG. 2 structure, when fabricated from the above-identified 255 nickel powder of substantially circular shaped particles and particle sizes in the range of three to five microns, when immersed in liquid sodium at a temperature of 328° C., is found capable of generating a column of liquid sodium which easily and rapidly reaches 9 inches in height. Since this liquid sodium height is attained in a period of five to ten minutes, and occurs in accordance with a linear height versus time relationship (the Table 1 data corresponds to a straight line with a correlation factor 0.9935), it is clearly indicative of significantly greater possible wicking heights achievable with the porous material of the invention in either the battery or heat pipe or other use environments.

The rate of travel of the liquid sodium in the herein described wicking material is in accordance with Table 1 below.

TABLE 1

| Distance | Time |
|---|---|
| 1 inch | 7 seconds |
| 2 inches | 20 seconds |
| 3 inches | 40 seconds |
| 4 inches | 49 seconds |
| 5 inches | 60 seconds |
| 6 inches | 77 seconds |
| 7 inches | 94 seconds |
| 8 inches | 120 seconds |
| 9 inches | 135 seconds |

The possibility of dissimilar velocities or non-linear velocity of liquid travel in opposite travel directions in the porous material of the present invention is also notable and offers a potentially useful arrangement for accomplishing specialized tasks as is described in the above identified co-pending patent application, "Unidirectional Heat Pipe".

Materials other than the above-identified metal and metals other than the above-identified nickel are, of course, usable in fabricating wicking structure in accordance with the invention. Materials such as stainless steel, copper, aluminum and iron are included in this list. Suitable adjustments for the material temperatures involved in the fabrication steps of FIG. 2 and FIG. 3 below herein are, of course, required during the use of these alternate metals and non-metallic materials.

As is also indicated in the above referred-to co-pending patent application of myself and three other colleagues, the application titled "Battery Cell Wicking Structure and Method", uses of the present invention involving heat energy flow are enhanced by the use of metallic or other high thermal conductivity powder in the porous material.

The presence of a mild chemical reaction between the wick liquid effluent and the particles of the herein described porous material may also be advantageous under some operating conditions. A reaction of this nature is believed present in the above-described liquid sodium and nickel particle wicking arrangement and is believed to contribute to the described superior wicking performance. This reaction is to the extend of 0.004 to 0.20 parts per million at a temperature in the range of 200° C. to 600° C. as is described in the "Electrical Battery Cell Wicking Structure and Method" application from the above list of co-pending patent applications. The presence of such a reaction, of course, is accompanied by a resulting reaction product contamination of the wicked liquid effluent or the porous material or both but in view of the limited reaction occurring, this effect is of minor significance. A finite operating life for the wicking structure is also implied by this reaction, however, other failure mechanisms are usually more significant in determining the end of a cell practical operating life. The glass and alumina based materials identified above are immune from participation in reactions of this type with most wicked materials.

FIG. 2 in the drawings shows a sequence of processing steps 300 by which the FIG. 1 and incorporated FIG. 2 illustrated porous material wick structure can be fabricated. As indicated at 302 in FIG. 2, this processing sequence may commence with a substrate shaped in some predetermined configuration. When such a substrate is sued, its surface is prepared for reception of the wicking material by way of an etching or similar process as is indicated at 304 in FIG. 2. When the substrate material is alumina or a similar material, a surface preparation etch can be accomplished by exposing the alumina to water at a temperature of 200° C. for a period of 1 to 5 minutes or in a more rapid manner by exposure of the alumina surface to an alkali hydroxide in, for example, an aqueous based 1.0 normal concentration of sodium hydroxide. Exposure times of less than one minute at a temperature of 20° C. are found to be satisfactory for the alkali etching sequence. In the case of alternate substrate members, surface preparation may be accomplished by an etch which uses selected reactant materials or by mechanical abrasion.

Coating of the substrate surface with a metallic particle slurry is indicated in the step of 306 in FIG. 2. The method of accomplishing this coating is dependent upon the shape of the substrate member being coated and upon the internal surface or external surface nature of the coated area. For the external surface coating arrangement shown in FIG. 1, the coating of step 306 may be accomplished by brush application of the small particle slurry directly onto the substrate surface with supplementing, in order to achieve greater wicking member thickness, accomplished by sprinkling additional metallic particle dry powder over the slurry wetted surface as is indicated in step 308 in FIG. 2. Slurry application by spraying, dipping, flowing, or even a mixing of the dry powder with a solvent material in the presence of the substrate member are all within contemplation of the invention.

The slurry applied to the substrate member may consist of a solvent such as, for example, an alcohol, preferably alcohol of the ethanol type or water that is added to the dry powder of the wicking material. Also included in the slurry is a dissolved organic binder material such as the Methocel ® binder that is sold in powder form by Dow Corning Corporation and a water soluble resin of, for example, the Polyox ® type that is sold by Union Carbide Corporation.

Preparation of the slurry with the metal particles and the combined organic binder material using an alcohol or water solvent or other solvents is described by the manufacturers and typically involves proportions as follows:
200 grams of Type 255 Nickel Powder
2 grams of Polyox ®
2 grams of Methocel ®
240 grams of water The slurry is prepared by mixing the dry ingredients and then adding water with continuous stirring.

If a shape compatible with rotational spinning is involved, spinning at about 1500 RPM may be accomplished for two hours or until the slurry is dry. After spinning or in lieu thereof a baking at 500° C. for one hour is used followed by a one hour sit and a 5-minute bake at 1000° C. For use in the brush application sequence identified above, it is preferable that the organic binder material have a room temperature viscosity that is in the range of 500 centistokes to 1000 centistokes with a value near the 750 centistokes center of this range being preferred. A cannon-Fenske opaque (reverse flow) viscosimeter may be used for such viscosity measurements. It is desirable of the wicking member particles to be somewhat movable in the viscous predry or pre-bake slurry during and following the particle to substrate application in order that the agglomeration of particles represented in FIG. 3 be possible during solvent dissipation and binder material disintegration and dissipation.

In instances where the wicking material is to be fabricated in a stand-alone or non-substrate associated form, the slurry material may be confined to a mold or predetermined container shape during its green or uncured condition and may also be fabricated in successive layers of wicking material with each layer acting as a substrate for a successive layer.

The green wicking member, that is, the uncured slurry comprising a wicking member and resulting from particle application in steps 306 and 308 in FIGS. 2 is dried as is indicated by the block 310 in FIG. 2 using a vacuum drying, air drying or other controlled atmosphere drying process and using temperatures in the range of 500° C. and drying times in the range of one hour. This drying, of course, removes a major portion of the solvent material present in the green wicking member. During its initial phase this drying also encourages particle movement under the influence of surface tension and adhesion between the binder coated particles to provide a structure of the type shown in incorporated FIG. 2.

The green wicking member is fired in a reducing gas atmosphere furnace at temperatures which are preferably in the 900° C. to 1000° C. range for a period of about of five minutes following the attainment of stable temperature; this firing is indicated by the sintering step at 310 in the FIG. 2 sequence. The indicated 5 minute time and 900° C.-1000° C. temperature values for the sintering step 312 in FIG. 2 are typical of values that are satisfactory for the identified nickel powder slurry and such values result in individual particles having the degree of melted fusion shown in incorporated FIG. 2. Longer times and higher temperatures for the sintering step provide greater degrees of particle melting and result in more "stringy" or less well-defined individual particle appearance for the achieved porous material. A large variety of particle fusion and particle appearance variations is, therefore, available in the porous material by way of selecting the times and temperatures used in the sintering step of block 312 in accordance with the experience of persons skilled in the heat treatment arts.

Although porous material having the general appearance shown in incorporated FIG. 2 is satisfactory for some uses of the invention including use for the liquid sodium wicking in an electrical battery cell, other employments of the invention involving different effluent materials and different effluent viscosities may be enhanced through the use of different times an temperatures in the step 312. Similarly, with the selection of different metals or different non-metallic materials for the porous material, a different set of time and temperature values will be optimum—temperatures in excess of the 900° C.-1000° C. value will, for example, be desirable int he case of ceramic materials.

For a nickel porous structure, the atmosphere in the firing or sintering furnace si preferably made to be reducing in nature by the addition of hydrogen in the concentration range of 4 to 5% or by the addition of other reducing gases as are known in the art. Otherwise, the furnace has an inert atmosphere of helium, argon, nitrogen, or similar gases. A reducing gas atmosphere is desirable int he furnace since hydrogen and other such reducing gases combine with oxygen or oxide layers on the metallic particles at elevated temperatures thereby cleansing the metallic surfaces and allowing intimate sintering fusion of the particles to occur.

Some reducing gases are capable of attacking some substrate materials that may be used for supporting the porous structure in its green state—especially at temperatures just below the above indicated 900° C. to 1,000° C. range. In view of this tendency, the cooldown of a porous nickel sintered metal member as is indicated at 314 in FIG. 2 is preferably arranged to occur in an inert gas atmosphere, that is the reducing gas component of the sintering atmosphere is removed while the workpiece is yet at the elevated sintering temperature. Regardless of this refinement, however, the cooldown sequence is preferably accomplished according to a predetermined temperature profile which generally includes a temperature reduction rate of 200° C. per hour. Following the sintering step of block 314 wicking member thicknesses in the range of eighty thousandths of an inch are desired in the nickel particle and alumina substrate use of the invention.

Generally, the need for a tradeoff compromise is recognized between the desirability of small liquid transmitting passages in a porous material—in order to achieve high capillary pressures—and the desirability of large liquid transmitting passages capable of conducting higher volumes of fluid through the porous material. The small passage and high capillary pressure end of this election scale are desirable for achieving large effluent delivery heights while the large liquid transmitting passage end of this selection scale is desirable to accomplish, for example, greater heat transmission in a heat pipe or the greater reactant communication need for large current delivery in a battery cell. Since large working fluid passages inherently have low capillary pressure characteristics such a compromise is clearly required. One arrangement of this compromise involves the use of arteries of somewhat large diameter to transmit fluid to a region of sue and capillaries of smaller diameter to distribute the artery transmitted fluid within the region of use. This arrangement is employed in the example below.

When used in a heat pipe of the below indicated physical size and other parameters, a porous nickel structure according to the invention provides desirable heat transfer characteristics as are also discussed below. The heat pipe of this discussion is contained in a circular tube of 0.875 inch, 2.2225 centimeters, inside diameter of type 304 stainless steel having 0.0625 inch wall thickness and 8.875 inch length with end plugs of 0.25 inch thickness—so that an effective length of 8.375 inches or 21.27 centimeters is achieved. A 0.375 inch inside diameter fill tube is received in one end plug. Eight fluid communication arteries of 0.075 inch diameter are dispersed uniformly around the porous wick structure.

Methanol working fluid of a volume of 26.3 cubic centimeters is introduced into the heat pipe. The 26.3 $cm^3$ volume substantially fills the heat pipe since a porous material porosity of eight seven percent is measured and an extra ten percent of working fluid volume is added to accommodate condensate trapped in the fill tube.

The theoretical heat transfer limits incurred in a heat pipe use of the porous material of the invention—that is the working fluid physics limits are identified as the sonic limit, the entrainment limit, the boiling limit and the capillary limit. These limits for the working envelope of a heat pipe are known in the art and are described, for example, in the textbook "Heat Pipe Theory and Practice" written by S. W. Chi and published by Hemisphere Publishing Company of Washington, D.C. In the described heat pipe structure, the first two of these limiting considerations support a relatively large quantity of heat transmission and are, therefore, of minimal porous material describing interest. Of the latter two limiting phenomena the boiling limit $Q_b$ is most significant by an order of magnitude in determining the maximum heat transfer capability of the described heat pipe when the assumed values of the working envelope limit equation variables are used. As is known to persons skilled in the art, however, the determination of accurate values for some limit equation variables is usually accomplished with some difficulty.

More specifically for the porous material of the invention used in a heat pipe, the Sonic Limit, $Q_{s.max}$ is predicted by the relationship:

$$Q_{s,\max} = A_v P_v \lambda \frac{\gamma_v R_v T_v}{2(\gamma+1)}^{\frac{1}{2}}.$$

In a similar fashion, the Entrainment Limit is predicted by the relationship $$Q_{e,\max} = A_v \lambda \frac{\gamma P_v}{2 r_{h1} s}^{\frac{1}{2}}.$$

The Boiling Limit is predicted by the relationship:

$$Q_{b,\max} = \frac{2 \pi L_{ev} k_e T_v}{\lambda P_v \ln(r_i/r_v)} \frac{2\lambda}{r_N} - P_c.$$

The Capillary Limit is predicted by the relationship:

$$Q_{c,\max} = \frac{(QL)_{c.\max}}{\frac{1}{2} L_c + L_A + \frac{1}{2} L_{ev}}.$$

In most heat pipe arrangements, the Capillary Limit $Q_c$ defines the operating region boundary of greatest concern.

The heat transfer ability of the described heat pipe having nickel particle porous material according to the invention is in the range of one hundred twenty-five watts. This value si subject to improvement with optimization.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. A method for fabricating liquid conducting porous material comprising the steps of:

disposing a liquid suspension wet coating of metal particles of a particle size less than twenty microns and an organic binder onto a predetermined ceramic substrate;

adding similar additional of said same metal particles as a dry powder to the surface of said liquid suspension wet coating;

drying the combined metal particle coating and then heat treating the combined metal particle coating for a predetermined time interval in a gas atmosphere held above the decomposition temperature of said organic binder material at a sintering temperature below the melting point of said metal particles.

2. The method of claim 1 wherein said liquid suspension of finely divided metal particles and organic binder has a viscosity between five hundred centistokes and one thousand centistokes.

3. The method of claim 1 wherein said metal particles are comprised of nickel.

4. The method of claim 3 wherein said heat treating includes sintering said nickel particles and wherein said reducing gas atmosphere includes both an inert gas and gaseous hydrogen.

5. The method of claim 4 further including the step of removing said hydrogen gas from said atmosphere during a cooldown portion of said nickel particle sintering.

6. The method of claim 2 wherein said rigid porous substrate member is comprised of alumina.

* * * * *